Oct. 6, 1942.     N. M. JONES     2,298,214
COOLANT-FUEL MECHANISM AND METHOD
Filed July 24, 1942
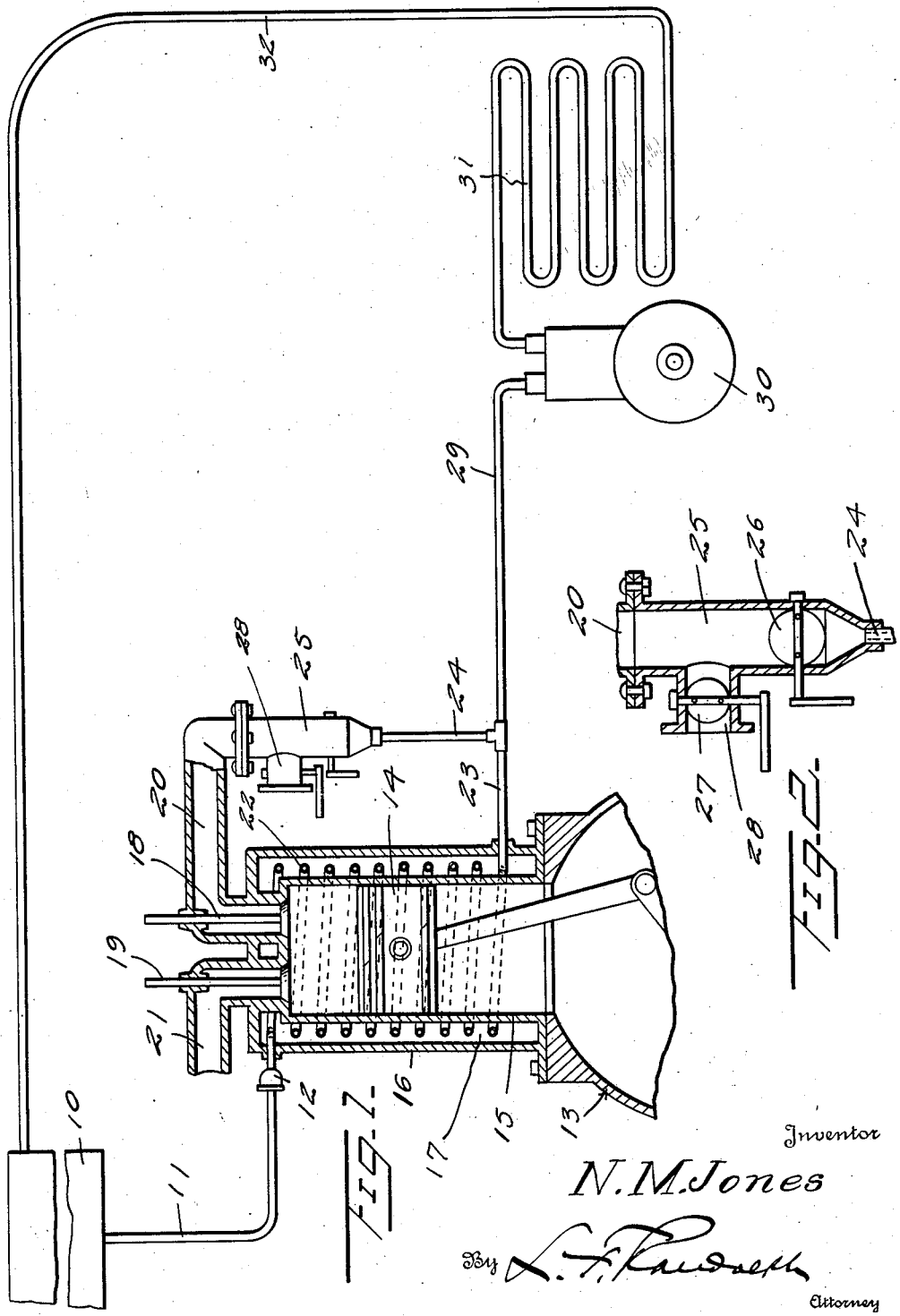
Inventor
N. M. Jones
By L. F. Randreth
Attorney Patented Oct. 6, 1942

2,298,214

UNITED STATES PATENT OFFICE 2,298,214

COOLANT-FUEL MECHANISM AND METHOD

Nelson M. Jones, Sarasota, Fla., assignor to Green's Fuel, Incorporated, Sarasota, Fla., a corporation of Florida Application July 24, 1942, Serial No. 452,223

3 Claims. (Cl. 123—170)

This invention relates to a means and method whereby a portion of vaporized fuel serving as a coolant in the cooling system of an internal combustion engine may be condensed and returned to the fuel storage tank or source in order to effect additional cooling.

I also aim to provide means to draw off coolant vapor from systems such as are disclosed in my patents #2,234,900 and #2,244,623 and recycling same through a compressor and condenser back to the same to increase the cooling effect.

The more specific objects and advantages will become apparent from a consideration of the description following taken in connection with accompanying drawing illustrating an operative embodiment.

In said drawing:

Figure 1 is a view diagrammatically showing the apparatus according to the invention, and Figure 2 is a vertical sectional view through the mixing valve.

Referring specifically to the drawing wherein like reference characters designate like or corresponding parts, 10 designates a fuel tank adapted to contain "liquid petroleum gases" such as propane, butane or any equivalent which produces a refrigerating effect when passing from the liquid to the gaseous state. The fuel or liquid petroleum gas passes from the tank 10 through a supply pipe 11 containing a standard or other refrigeration expansion valve 12 which may be of the vapor expansion type or of the flooded cooling type as preferred. By way of example, a one cylinder internal combustion engine is shown at 13. The engine may have any desired number of cylinders. The engine has a piston 14 which is reciprocable in a cylinder 15 surrounded by a jacket 16 forming a chamber 17 for water or other cooling agent. Inlet and exhaust valves are shown, respectively, at 18 and 19, at terminals of the inlet manifold 20 and exhaust manifold 21, respectively.

Said pipe 11 past the expansion valve 12 communicates with a coil 22 located in the water jacket 17 and at its lower end has a terminal 23 extending through the jacket 16 to the exterior of the engine. From branch or terminal 23, a short pipe 24 leads to a conventional mixing valve structure 25 which is in communication with the intake manifold 20. A valve 26 in the mixer 25 is operable to control the amount of vapor entering the mixing valve and a valve 27 located in a branch 28 communicating with the atmosphere, controls the supply of air admitted to the mixing valve 25 for admixture with the gas therein.

The structure described may be that disclosed in Letters Patent issued to me #2,234,900 and #2,244,623 or the equivalent. As the structure operates, it will be realized that the fuel in liquid form passes from tank 10 through pipe 11 and by reason of the expansion valve 12 is converted into a gas as it enters the coil 22 and in gaseous form passes through conduit 23 and conduit or pipe 24, entering the valve 25 and admixing with air therein, and as a carbureted mixture passing through manifold 20 into the engine for firing to actuate the piston 14.

A portion of the gas from pipe 23 also passes through pipe 29 to a conventional compressor unit 30 of the type used in refrigeration and from the unit 30, the gas passes through a condenser coil 31 and from the latter through a pipe or conduit 32 back to the supply tank 10.

It will be realized that the cooling effect of the fuel as it passes from the liquid to the gaseous state, serves to cool the engine and, particularly, the water in the space or jacket 17 and the portion of the gas which is compressed at 30 and then condensed at 31 and returned to the tank 10, serves to increase the refrigerating effect.

Various changes may be resorted to provided they fall within the spirit and scope of the invention.

I claim as my invention:

1. In a system wherein an internal combustion engine is cooled by expansion of liquid fuel into a gas and the latter is admixed with air and fired to drive the engine, returning a portion of the gas before admixture with air through a compressor and condenser back to the source of supply.

2. A method consisting in cooling an internal combustion engine by expansion of liquid fuel into a gas, using a portion of the gas in admixture with air for ignition to drive the engine, and in compressing and condensing another portion of the gas and returning it to the source of fuel supply.

3. Apparatus of the class described comprising an internal combustion engine, a jacket about the same and having a mixing valve to supply carbureted air to the engine, means to expand liquid fuel into a gas and pass the same through said jacket and a portion thereof to said valve, and means through which a portion of said gas passes in communication with the source of supply and including a compressor and condenser.

NELSON M. JONES.